US012661924B2

(12) United States Patent
Evangelisti et al.

(10) Patent No.: US 12,661,924 B2
(45) Date of Patent: Jun. 23, 2026

(54) COVERING ELEMENT, METHOD FOR DECORATING A COVERING ELEMENT, AND MACHINE FOR DECORATING A COVERING ELEMENT

(71) Applicant: Unilin BV, Wielsbeke (BE)

(72) Inventors: Diego Evangelisti, Torre Maina Maranello (IT); Ivano Marasti, Torre Maina Maranello (IT); Giovanni Bassani, Fiorano Modenese (IT); Nest Mandi, Sassuolo (IT)

(73) Assignee: Unilin BV, Wielsbeke (BE)

(*) Notice: Subject to any disclaimer, the term of this patent is extended or adjusted under 35 U.S.C. 154(b) by 367 days.

(21) Appl. No.: 17/686,492

(22) Filed: Mar. 4, 2022

(65) Prior Publication Data

US 2022/0185002 A1 Jun. 16, 2022

Related U.S. Application Data

(63) Continuation of application No. 16/771,740, filed as application No. PCT/IB2018/059353 on Nov. 27, 2018, now Pat. No. 11,298,971.

(30) Foreign Application Priority Data

Dec. 15, 2017 (EP) .................................... 17207699

(51) Int. Cl.
*B44C 1/22* (2006.01)
*B28B 11/04* (2006.01)
(Continued)

(52) U.S. Cl.
CPC ............ *B44C 1/222* (2013.01); *B28B 11/044* (2013.01); *B28B 11/0818* (2013.01);
(Continued)

(58) Field of Classification Search
CPC ........ E04F 15/082; E04F 15/08; B44C 1/222; B26D 7/01; B26D 3/02
See application file for complete search history.

(56) References Cited

U.S. PATENT DOCUMENTS

| | | |
|---|---|---|
| 4,594,768 A | 6/1986 | Gater et al. |
| 5,637,236 A | 6/1997 | Lowe |

(Continued)

FOREIGN PATENT DOCUMENTS

| | | |
|---|---|---|
| CN | 207223646 * | 10/1994 |
| CN | 201059054 Y | 5/2008 |

(Continued)

OTHER PUBLICATIONS

International Search Report and Written Opinion for PCT Application No. PCT/IB2018/059353 mailed Apr. 4, 2019.

(Continued)

*Primary Examiner* — Tabassom Tadayyon Eslami
(74) *Attorney, Agent, or Firm* — Troutman Pepper Locke LLP; James E. Schutz; Chris N. Davis

(57) ABSTRACT

A set comprising a plurality of covering elements for floors and/or walls, wherein each covering element comprises an upper surface having a pattern and at least one distressed upper edge, wherein at least two covering elements of the set comprises substantially the same pattern, and wherein the shape of the distressed upper edge differs in each covering element of the set.

12 Claims, 2 Drawing Sheets

(51) Int. Cl.

| | |
|---|---|
| ***B28B 11/08*** | (2006.01) |
| ***B28B 11/24*** | (2006.01) |
| ***B44C 5/04*** | (2006.01) |
| ***E04F 13/08*** | (2006.01) |
| ***E04F 13/14*** | (2006.01) |
| ***E04F 15/08*** | (2006.01) |

(52) U.S. Cl.

CPC .......... *B28B 11/243* (2013.01); *B44C 5/0461* (2013.01); *E04F 13/0873* (2013.01); *E04F 13/142* (2013.01); *E04F 15/082* (2013.01)

(56) References Cited

U.S. PATENT DOCUMENTS

| | | | | |
|---|---|---|---|---|
| 7,404,755 | B2 | 7/2008 | Gebhart et al. | |
| 8,733,063 | B2 | 5/2014 | Song et al. | |
| 2005/0138882 | A1 | 6/2005 | Rothdach et al. | |
| 2007/0113502 | A1 | 5/2007 | Nunn | |
| 2008/0193669 | A1 | 8/2008 | Coadou | |
| 2012/0096793 | A1 | 4/2012 | Riccobene | |
| 2016/0319554 | A1* | 11/2016 | Thiers | C04B 41/009 |
| 2017/0218632 | A1 | 8/2017 | Patki et al. | |

FOREIGN PATENT DOCUMENTS

| | | | |
|---|---|---|---|
| CN | 102248458 | A | 11/2011 |
| CN | 203080849 | U | 7/2013 |
| CN | 204894810 | U | 12/2015 |
| CN | 206296998 | * | 7/2017 |
| CN | 103395109 | B | 10/2017 |
| CN | 211465860 | * | 9/2020 |
| EP | 1038689 | B1 | 4/2004 |
| EP | 1524089 | A2 | 4/2005 |
| FR | 2703286 | A1 | 10/1994 |
| FR | 2703286 | * | 4/2018 |
| GB | 2339160 | A | 5/2000 |
| IT | 101999900776632 | | 1/2001 |
| JP | 2001287500 | A | 10/2001 |
| RU | 2006127416 | A | 2/2008 |
| WO | 96/06716 | A1 | 3/1996 |
| WO | 2015092745 | A1 | 6/2015 |

OTHER PUBLICATIONS

European Search Report and European Search Opinion for European Patent Application No. 17207699.4 mailed Aug. 24, 2018.

Partial European Search Report for European Patent Application No. 17207699.4 mailed May 24, 2018.

Ceramic Glossary, Italian-English, English-Italian, Gruppo Editoriale Faenza Editrice S.p.a., published 1992.

Dr. Nilo Tozzi, Inkjet Decoration of Ceramic Tiles, Feb. 27, 2010, retrieved from https://digitalfire.com/article/inkjet+decoration+of+ceramic+tiles?login=1.

* cited by examiner

COVERING ELEMENT, METHOD FOR DECORATING A COVERING ELEMENT, AND MACHINE FOR DECORATING A COVERING ELEMENT

CROSS-REFERENCE TO RELATED APPLICATIONS

This application is a continuation of, and claims priority to, U.S. application Ser. No. 16/771,740 filed 11 Jun. 2020, which is a National Stage Entry of, and claims priority to, PCT Patent Application No. PCT/IB2018/059353 filed 27 Nov. 2018, which claims priority to European Patent Application No. 17207699.4 filed 15 Dec. 2017, the disclosures of each of which are hereby incorporated herein in their entireties.

BACKGROUND

The present invention relates to covering elements, for floors or walls for example, and to a method for decorating a covering element. The invention also relates to a machine for decorating covering elements.

As is known, covering elements for floors or walls, such as ceramic tiles, comprise a backing having an upper face bearing a pattern. The pattern is substantially two-dimensional and is formed by printing methods such as digital printing, flexography and/or screen printing. The upper surface of the covering element may also comprise a relief structure, possibly combined with the pattern, for example a structure representing the grain of natural stone or wood.

The surface structure is formed in a controlled way, usually during the step of forming the backing. For example, in the case of ceramic tiles, the backing is pressed in a mould, and the structure is formed in negative on the die of the mould. However, all the tiles formed with this die will have exactly the same structure, giving an impression of artificiality and repetition to the floor or to the wall cladding. In this case, it is possible to use more than one die, in order to mitigate the repetitive nature of the pattern. A tile forming press may have a plurality of cells (each for forming a respective tile), each of which may be associated with a die bearing a different structure. In this case also, however, tiles may be formed with a few different structures, for example four or six structures. Furthermore, the efficiency of this solution decreases as the size of the format increases; this is because the number of cells that may be included in the mould decrease as the size of the tile format increases. Similar considerations also apply to different methods of forming the backing or the structure, such as rolling or embossing. In these cases, the structure is provided by an incision made in a roller which presses on the covering elements, this incision will be repeated periodically on the covering elements whenever a new revolution of the roller begins.

US 2005/0138882 discloses an alternative solution for artificially distressing ceramic or concrete bricks or blocks, in which, after their consolidation (by firing, for example), the bricks or blocks are subjected to a finishing step. In the finishing step, one or more blocks are placed in a container filled with grinding media, and with water if required. The container is made to vibrate so that the grinding media strike the block, eroding it in an uncontrolled way. In this way, it is possible to produce blocks having structures which are entirely random and different from one another. A drawback of this solution is that the finishing must be carried out on the fired product; otherwise, the block would fracture because of the excessive stress. Moreover, this method cannot be used with tiles having a pattern on their upper surface, since, if the tile surfaces are worked in a substantially indeterminate way, this could damage their pattern while at least partially removing the glaze, thereby compromising the impermeability of the tile.

An object of the present invention is to overcome the aforementioned drawbacks of the prior art by means of a simple, rational and inexpensive solution. These objects are achieved by the characteristics of the invention stated in the independent claim. The dependent claims describe preferred and/or particularly advantageous aspects of the invention.

BRIEF SUMMARY OF THE CLAIMED INVENTION

In one aspect, the present invention provides a method for decorating covering elements for floors and/or walls, comprising the steps of: providing a backing of green ceramic material for the covering element; distressing at least one upper edge of the backing; and firing the covering element after the distressing step.

DETAILED DESCRIPTION OF THE INVENTION

Figure 1:
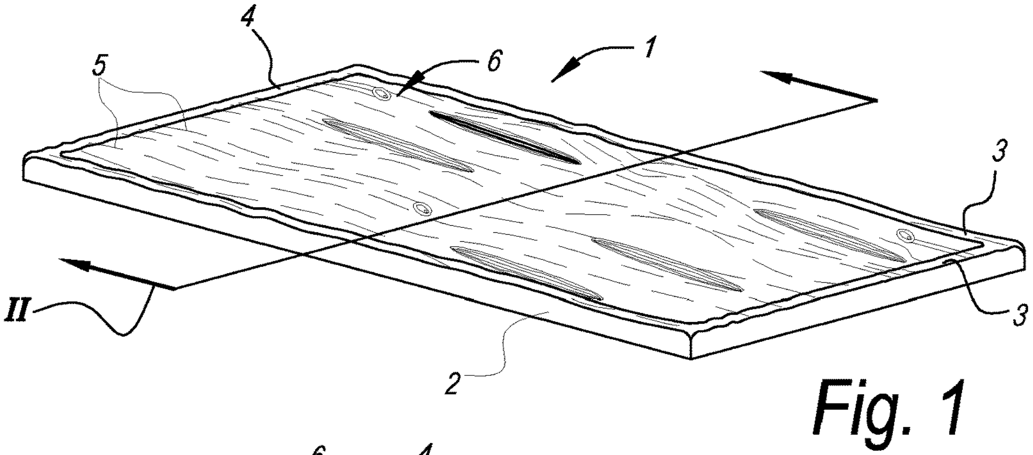
FIG. 1 is a perspective view of a covering element according to the invention.

A first independent aspect of the invention provides a covering element, for floors or wall cladding for example, which comprises a backing having at least one distressed upper edge. The term "distressed" means that the shape of the upper edge is artificially created and is such as to simulate the wear on the upper edge due to time and use; for example, distressing comprises chips, scratches, scrape marks and incisions. In other words, the surface of the upper edge comprises a shape, for example a three-dimensional structure, formed by recesses and protrusions, having irregular characteristics, for example variations in depth, width and/or length, and arranged in a random and non-predetermined order. Thus the distressed upper edge gives a general impression of distressing and wear of the covering element, thereby reducing the impression of its artificiality. It should also be noted that, since only the upper edge is distressed, the lower edges of the covering element are substantially linear (except for reinforcing ribs or other functional elements of the covering element). Preferably, the upper edge is distressed along its whole length. Clearly, also, the covering element may comprise a plurality of distressed upper edges, for example a pair of distressed upper edges which are opposed and parallel to one another; or, preferably, each upper edge of the covering element is distressed. Advantageously, each distressed upper edge has a different shape from the other distressed upper edges of the same covering element.

According to a preferred embodiment, the covering element is a ceramic tile or slab, that is to say one comprising a backing of ceramic material, for example porcelain stoneware, single-fired ceramic material, white or red body ceramic material, majolica, terracotta, or other ceramic powders sintered at high temperatures. It should be noted that, according to other embodiments, the covering element, and particularly its backing, may be made of other materials, such as wood or wood fibre, for example MDF or HDF (Medium Density Fibreboard or High Density Fibreboard, respectively), or plastic, for example vinyl, preferably PVC, or fibre-cement (one example of fibre-cement is the material known by the trade name of Micodur®). The covering element is preferably rectangular or square in shape, but there is no reason why it should not have a different shape, for example hexagonal.

Preferably, the distressing is carried out on at least one upper edge of the backing.

According to a preferred embodiment, the covering element has an upper face bearing a pattern comprising various dyes, designs or graphics. In particular, the pattern is formed on at least a central portion of the upper face of the covering element. The expression "central portion" means substantially the whole upper face, with the exception of the distressed upper edge, so that the upper edges substantially form a frame around the pattern. However, it is preferable for the pattern to be formed on the whole of the upper face of the covering element. In other words, according to a preferred embodiment, the distressed edge may be provided with the pattern. The pattern may simulate a natural material, such as natural stone or wood, or may represent a concrete, a resin, or any other graphic design. Preferably, the pattern is at least partially formed by a printed graphic design. The printing is preferably carried out by contactless printing methods such as digital inkjet printing or screen printing, since this also allows high-resolution printing on the irregular shape of the distressed edge. However, other printing methods, such as flexography, offset printing, or rotogravure, are not excluded. The pattern may comprise a black and white design, but colouring by plain dyeing may also be provided, in which case other methods of decoration are possible, such as spraying, or poured or film decoration. It is also not excluded that the pattern could be applied to a suitable pre-printed substrate to be fixed to the backing, for example a paper or plastic foil, made of PVC for example, particularly in the case of a wood or plastic backing.

The covering element may also comprise one or more coating layers on the upper face of the covering element.

For example, the coating layers may comprise a base coat configured to cover the upper surface of the backing at least partially, or preferably entirely. Thus the base coat may cover the colour of the backing while also making the backing impermeable; it may also be capable of receiving the pattern on itself, or may form the background of the pattern. In particular, according to a preferred embodiment, the base coat is configured to cover the distressed edge at least partially, or preferably entirely. In this case, the shape of the distressed edge is apparent through the base coat. Thus the base coat may cover the colour of the backing while making the backing impermeable on the distressed edge as well. The base coat may be white, beige, brown, grey or any other colour. According to a preferred embodiment in which the backing is made of ceramic material, the base coat preferably comprises a glaze and/or an engobe capable of covering the upper surface of the backing. According to other embodiments, however, the base coat may be formed from other materials such as grouts or resins, for example melamine or epoxy resins.

The coating layers may also comprise a protective coat which covers the upper face at least partially, or preferably entirely, and which can be placed on top of the pattern to cover and protect it. According to the preferred embodiment, the protective coat is configured to cover the distressed edge at least partially, or preferably entirely. In this case, the shape of the distressed edge is apparent through the protective coat. Thus the protective coat may also cover the pattern on the distressed edge. Advantageously, the protective coat may be transparent or translucent so that the underlying pattern remains discernible. The protective coat may also comprise fillers or additives capable of imparting new functionality and/or improving the surface properties of the decorative layer, for example wear-resistant, non-slip, anti-bacterial or stain-resistant properties. The protective coat may also be used in combination with the base coat, or the protective coat may be placed on top of the base coat. According to the preferred embodiment in which the backing is made of ceramic material, the protective coat preferably comprises a transparent glaze or a grit. According to other embodiments, however, the protective coat may be formed from other materials, preferably resins, for example melamine or epoxy resins.

It should also be noted that the upper face of the covering element may comprise a relief structure, for example a structure comprising recesses and protrusions, preferably arranged in a predetermined order, but there is no reason why such recesses and protrusions should not be arranged in a random order. In particular, the relief structure is arranged in a central portion of the upper face. Preferably, the relief structure has characteristics corresponding to characteristics of the pattern; for example, the recesses or protrusions may be directed along the grain of natural stone, so as to make the pattern formed on the slab more realistic. The relief structure may be formed according to various options, three of which are mentioned below by way of non-limiting and non-exhaustive examples.

According to a first option, the relief structure may comprise recesses and protrusions formed in the backing of the covering element. In this case, the relief structure may be apparent on the upper face of the covering element through the base coat and/or the protective coat. According to a second option, the relief structure may comprise recesses and protrusions formed in the base coat and/or in the protective coat, for example on top of a substantially flat upper surface of the backing. According to a third option, the relief structure may comprise a combination of recesses and protrusions formed according to the first and second options, or formed partially in the backing of the covering element and partially in the base coat and/or in the protective coat.

A second aspect of the invention provides a set of covering elements in which each covering element has one or more of the characteristics described in relation to the first independent aspect, and in which the at least one distressed upper edge has a different shape in each covering element. In other words, all the distressed upper edges of the set are shaped differently from one another. That is to say, the three-dimensional surface structure, formed by recesses and protrusions for example, of each distressed upper edge of the set has irregular characteristics, for example variations in depth, width and/or length, and these characteristics are arranged in a random and non-predetermined order, such as to make each distressed upper edge different and distinguishable from the other distressed upper edges of the set. Thus the characteristics of the appearance of each covering element of the set will differ from the other elements of the set, imparting a greater impression of distressing and wear to the set itself, and, especially, reducing the impression of repetitiousness and artificiality of the set. Clearly, the term "set" is taken to mean a plurality of covering elements, for example a covering formed from a plurality of covering elements adjacent to one another, for example a floor or a wall cladding, or a package comprising a plurality of covering elements.

According to an embodiment of the invention, at least two covering elements of the set have substantially the same pattern. In particular, these two covering elements have substantially the same pattern in the central portion of their upper faces. It is emphasized that the expression "substantially the same pattern" is taken to mean that the design and colour of the pattern coincide in the portions of the upper faces not affected by the distressed edges, and that they may differ slightly in minor aspects and details, particularly those due to the production process, such as, simply by way of non-limiting and non-exhaustive examples, the tone of the colour, the level of gloss, and printing defects.

According to an embodiment, at least two covering elements of the set have substantially the same relief structure. In particular, these two covering elements have substantially the same relief structure in the central portion of their upper faces. It is emphasized that the expression "substantially the same relief structure" is taken to mean that the elements of the relief structure and their arrangement coincide in the central portions of the upper faces not affected by the distressed edges, and that they may differ slightly in minor aspects and details, particularly those due to the production process, such as, simply by way of non-limiting and non-exhaustive examples, point defects such as blisters, flattening of the relief or minor differences of depth or height.

A third aspect of the invention provides a method for decorating covering elements, having one or more of the characteristics described in relation to the first independent aspect. In particular, according to the third independent aspect, the method includes the steps of: providing a backing for the covering element and distressing at least an upper edge of the backing. Preferably, the distressing step comprises a step of mechanical distressing, that is to say mechanical erosion or incision of the upper edge of the backing. In fact, mechanical distressing is preferred to other possible solutions such as chemical erosion, because of considerations concerning the safety of the work environment and environmental sustainability.

According to the preferred embodiment, the distressing may be carried out by means of a grinding wheel, preferably a shaped grinding wheel, that is to say one in which the active surface of the grinding wheel (in other words the active surface of the grinding wheel adapted to come into contact with the upper edge to be distressed) is not flat but has protuberances and/or pits. In this case, when the upper edge of the covering element is struck by the protuberance, a deeper recess is formed than when the upper edge is struck by a portion of the active surface of the grinding wheel that has no protuberance (a pit, for example). The shaping of the grinding wheel may have a regular and predetermined configuration, that is to say one in which the protuberances and/or the pits are arranged according to a predetermined design, for example with axial symmetry with respect to the axis of the grinding wheel, and/or have the same height relative to a reference plane perpendicular to the axis of the grinding wheel, for example relative to a surface of the grinding wheel opposed to the active surface. Preferably, however, the grinding wheel has an irregular configuration, that is to say one in which the protuberances and/or the pits are arranged in a non-predetermined way and asymmetrically with respect to the axis of the grinding wheel, and/or have different and irregular heights relative to a reference plane perpendicular to the axis of the grinding wheel, for example relative to the surface of the grinding wheel opposed to the active surface. In this way a greater irregularity is provided in the configuration of the distressed edge, thus reducing the impression of artificiality in the covering element. Furthermore, in this way the upper edges of the covering element will be struck and incised by the grinding wheel in a non-periodic and repetitive way, and therefore the distressed upper edges of different covering elements will exhibit different configurations from one another, thereby reducing the impression of artificiality and repetitiousness of a set of covering elements. The grinding wheel may have a diameter of between 10 cm and 40 cm, for example between 15 cm and 30 cm. It is emphasized that the grinding wheel represents a preferred embodiment, but other abrasive means may be used in an equivalent way.

Additionally, according to a preferred embodiment, the grinding wheel may rotate about its own axis with a variable rotation speed, for example with irregular and non-predetermined variations. Thus a further random variable is introduced into the process, making it possible to incise the upper edge to be distressed in such a way that the distressed upper edges of different covering elements will exhibit different configurations from one another. However, there is no reason why the rotation speed should not be varied in a periodic and determined way. For example, the grinding wheel may rotate about its own axis at a rotation speed of between 15 Hz and 70 Hz, or preferably between 20 Hz and 60 Hz.

It should also be noted that the axis of rotation of the grinding wheel may be incident on the upper edge to be distressed, or on an imaginary straight line parallel to said upper edge. Preferably, the axis of the grinding wheel and the upper edge to be distressed form a greater angle of incidence of between 90° and 180°, for example between 120° and 180°. The inventors have found that an increase in the angle of incidence decreases the contact surface between the grinding wheel and the backing, and therefore decreases the stress on the backing and the consequent risk of undesired damage to the backing, in the form of deep cracks for example. Additionally, according to a preferred embodiment, the axis of the grinding wheel is incident on the plane in which the backing lies, for example a horizontal plane. Advantageously, the axis of the grinding wheel and the plane in which the backing lies form a working angle of between 0° and 90°, for example between 45° and 90°. The inventors have found that, when the working angle is increased, the grinding wheel incises the upper surface of the backing to a greater degree than the lateral surface, and therefore the distressing of the edge will be more visible from a direction approximately perpendicular to the plane in which the backing lies, for example from above in the case of floor tiles. According to some embodiments, the angle of incidence and/or the working angle of the grinding wheel may be variable.

It should be noted that the method may provide for the distressing of a plurality of upper edges of the covering element, for example pairs of parallel upper edges, or preferably all the edges of the covering element. Advantageously, the method may provide for the use of different grinding wheels for distressing different upper edges; for example, the method may provide for the distressing of each upper edge with a respective grinding wheel.

The method may also provide a step of moving the backing along a predetermined direction of advance, preferably parallel to the upper edge to be distressed, and distressing the upper edge during this advance. For example, the backing may be placed on a conveyor, preferably of the band or belt type, and the grinding wheel may be placed at the side of said conveyor; for example, a plurality of grinding wheels may be placed on opposite sides of the conveyor to work on opposite upper edges of the backing. In some embodiments, the backing may advance in the direction of advance at a speed of advance of between 10 m/minute and 50 m/minute, for example between 20 m/minute and 40 m/minute. In particular, the speed of advance of the backing during the erosion step may be different from, and preferably lower than, the speed of advance of the backing immediately upstream and/or immediately downstream of said distressing step. Thus, during the erosion step, the backing is kept more stable and the stress on the backing is reduced, thereby also reducing the risk of undesired damage to the backing, such as deep cracks. Additionally, according to a preferred embodiment, during the erosion step the backing may be kept in a substantially fixed position relative to the conveyor; for example, it may be kept in a substantially fixed position on the conveyor band or belt. In other words, during the distressing step, movements of the backing in the plane parallel to the direction of advance, that is to say in any horizontal direction, may be limited or preferably prevented, so as to stabilize the backing and reduce the risk of undesired damage to the backing. Additionally, to minimize the risk of undesired damage to the backing, movements of the backing in a direction orthogonal to the plane in which the backing lies, in other words in a substantially vertical direction, may be limited or preferably prevented during the distressing step. This is particularly important in a preferred embodiment in which the covering element is a ceramic tile, since, in this case, a crack in the backing may lead to defects in the tile, especially after firing, and in some cases these defects in the backing may result in the fracture of the tile. For example, the backing may be retained by mechanical retaining means such as containing strips, or by the application of a vacuum by suction devices in the conveyor.

According to some preferred embodiments, the step of providing the backing of the covering element may provide for a step of forming said backing, by pressing, extrusion, rolling, or other methods, for example. For example, according to the preferred embodiment in which the covering element is a ceramic tile, the backing may be formed by compacting powders of ceramic raw materials (clays, kaolins, feldspars, quartz, carbonates, frits, etc.) by continuous compaction and/or discontinuous pressing. Additionally, according to this preferred embodiment, the backing is dried before the distressing step and after the forming step. This is because ceramic powders are dried after forming to remove the water required to activate the plastic properties of the clay in order to give the backing the necessary mechanical strength for movement to a subsequent firing step. The drying is preferably carried out at temperatures above 80° C., for example above 100° C. The drying is preferably carried out before distressing. According to other embodiments, the backing may be formed by other methods.

The method may also comprise a step of applying a base coat on the upper surface of the backing. In particular, according to the preferred embodiment of the invention, the base coat may be applied after the distressing of the upper edges of the backing, and, preferably, the base coat may also be applied to the distressed edges so as to cover the backing entirely and make it impermeable on the distressed edges as well. For example, the base coat may be applied in the wet state, by pouring or spraying for example, so as to deposit a substantially uniform layer on the upper surface of the backing. However, there is no reason why the base coat should not be applied by other methods, for example by digital printing, screen printing or flexography, or by dry application methods.

It should also be noted that the method may also provide a step of applying a pattern on the upper surface of the backing. Preferably, the pattern is printed on the upper surface of the backing. According to preferred embodiments of the invention, the printing is carried out after the distressing of the upper edges of the backing, and is preferably carried out so as to decorate the distressed edges. In this way the realism of the distressing effect may be improved. Additionally, the printing is preferably carried out by digital printing, for example inkjet printing, although other printing methods such as screen, flexographic, offset or rotogravure printing are not excluded. However, inkjet printing, and contactless printing methods in general, are preferred because they enable the pattern to be applied on the distressed edges. It is emphasized that the pattern may be applied on the base coat or directly on the upper surface of the backing. There is also no reason why the pattern should not be applied to a suitable substrate, for example a paper or plastic foil, made of PVC for example, to be fixed to the backing, particularly in the case of a wood (MDF or HDF) or plastic (PVC) backing.

Advantageously, the method may also comprise a step of applying a protective coat on the upper surface of the backing. In particular, according to the preferred embodiment of the invention, the preferred coat may be applied after the distressing of the upper edges of the backing, and, preferably, the protective coat may also be applied to the distressed edges so as to protect the surface and any underlying pattern on the distressed edges as well. The protective coat is preferably applied in the wet state, by pouring or spraying for example, so as to deposit a substantially uniform layer on the upper surface of the tile. There is no reason why the protective coat should not be applied by other methods, for example by digital printing, screen printing or flexography, or by dry application methods.

It should also be noted that the method may comprise a step of fixing the pattern to the backing. The term "fixing" means a step in which the pattern is consolidated with the backing, for example by means of a chemical and/or physical transformation. For example, "fixing" may be taken to mean steps of curing, sintering, crystallization, solidification, hydration, etc. Preferably, during the fixing step, the base coat and/or the protective coat are fixed simultaneously to the pattern. According to the preferred embodiment in which the covering element is a ceramic tile, the fixing step comprises the firing of the backing and the pattern, for example by firing at above 900° C., preferably above 1000° C., for example about 1200° C. In particular, said embodiment also includes the firing of the backing, that is to say the sintering of the compacted ceramic powders by what is known as a single firing process, in which the ceramic backing and the glaze are fired simultaneously. The pattern is preferably fixed after the distressing step. In practice, according to the preferred embodiment, in which the covering element is a ceramic tile, the distressing is carried out on a green backing, that is to say a backing formed from an unfired ceramic material, or, more accurately, formed from the compacted, and preferably dried, ceramic body.

A fourth independent aspect of the invention provides an apparatus for decorating a covering element, that is to say an apparatus for distressing at least an upper edge of a covering element. According to the fourth independent aspect, the device comprises at least one device for supporting the covering element, that is to say for supporting the backing of the covering element, and at least one grinding wheel configured to come into contact with at least one upper edge of the covering element and a device for driving the at least one grinding wheel in rotation about the axis of the grinding wheel. It should be noted that the grinding wheel and the other components of the apparatus may have one or more of the characteristics described in relation to the third independent aspect. In particular, it is preferable for the means for driving grinding wheel in rotation to be configured to drive it in rotation at variable rotation speeds, for example with irregular and non-predetermined variations. Thus it is possible to incise the upper edge to be distressed in an irregular way, so that the distressed upper edges of different covering elements will exhibit different configurations from one another. The drive device may, for example, comprise an electric motor which is mechanically connected directly to the grinding wheel. Preferably, the apparatus comprises a plurality of grinding wheels, for example two grinding wheels for distressing parallel upper edges of the covering element, and preferably the apparatus may comprise a drive device for each grinding wheel.

According to a preferred embodiment, the supporting device is a conveyor device, of the band or belt type for example, for transporting the covering element along a direction of advance. In practice, the transport element moves the covering element into the proximity of the grinding wheel so that the latter may proceed to distress the upper edge. Preferably, the direction of advance is substantially parallel to the upper edge to be distressed.

The apparatus may comprise a frame to which the grinding wheels and drive devices are connected. For example, the supporting device may also be connected to the frame, and may be fixed to it, for example. Additionally, the grinding wheels of the apparatus may be connected to the frame so as to be arranged according to the angle of incidence and/or the working angle, as described in relation to the third independent aspect. According to some embodiments, the angle of incidence and/or the working angle of the grinding wheel may be variable; that is to say, the grinding wheels may be pivoted on the frame so that the angle of incidence and/or the working angle can be varied.

The apparatus may also comprise retaining elements configured to keep the covering element in a substantially fixed position relative to the conveyor. In practice, the retaining elements are configured to limit, or preferably prevent, movements of the covering element relative to the conveyor in the plane parallel to the direction of advance, that is to say in any horizontal direction, so as to stabilize the covering element and reduce the risk of undesired damage to the covering element. The retaining elements may also be configured to limit, or preferably prevent, movements of the covering element in a direction orthogonal to the plane in which the element lies, that is to say in a substantially vertical direction. For example, the retaining elements may be of the mechanical type, such as containing strips or means for creating a vacuum. According to the preferred embodiment, the retaining elements comprise a horizontal border capable of pressing on the upper face of the covering element; for example, the horizontal border comprises a band or belt driven along the direction of advance, for example at the same forward movement speed as the covering element (that is to say, at the same speed of advance as the conveyor). In particular, the horizontal border is configured to press on a central portion of the upper face of the covering element; for example, the width of the horizontal border is less than the width of the covering element.

According to some embodiments, the apparatus may comprise at least one device for recovering machining debris and trimmings produced by the distressing. For example, the recovery device may comprise a suction device or a container placed near the grinding wheel. The collected material may subsequently be recycled or re-used in the process for producing the covering element, particularly the backing.

Further characteristics and advantages of the invention will be apparent from a perusal of the following examples, provided solely by way of non-limiting example, with the support of the figures shown on the appended sheets.

FIG. 1 is a perspective view of a covering element according to the invention.

Figure 2:
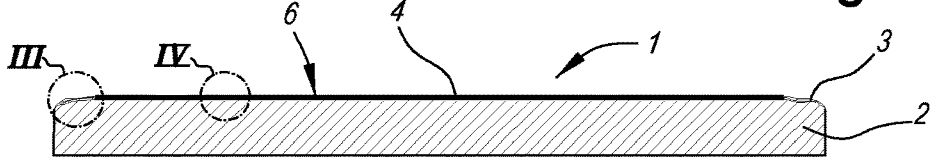
FIG. 2 is a cross section taken along the plane II of FIG. 1.

FIG. 2 is a cross section taken along the plane II of FIG. 1.

Figure 3:
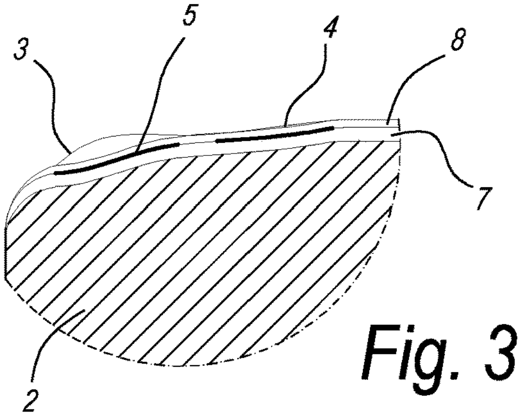
FIG. 3 is an enlargement of the detail III of FIG. 2.

FIG. 3 is an enlargement of the detail III of FIG. 2.

Figure 4:
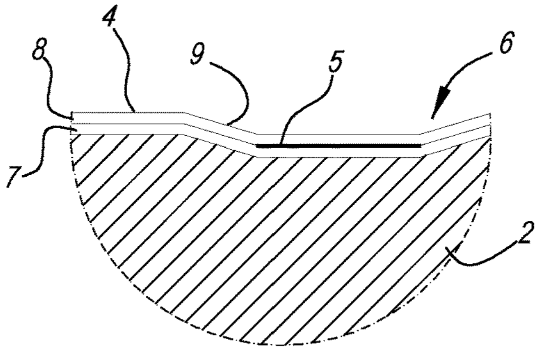
FIG. 4 is an enlargement of the detail IV of FIG. 2.

FIG. 4 is an enlargement of the detail IV of FIG. 2.

Figure 5:
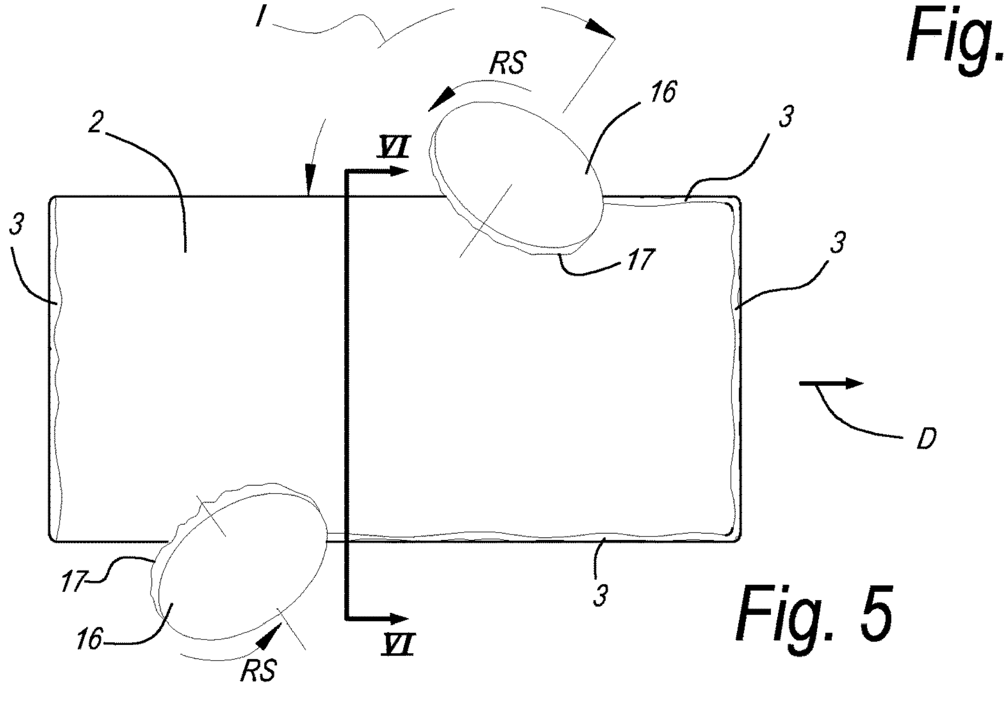
FIG. 5 is a top view of a covering element during the distressing step.

FIG. 5 is a top view of a covering element during the distressing step.

Figure 6:
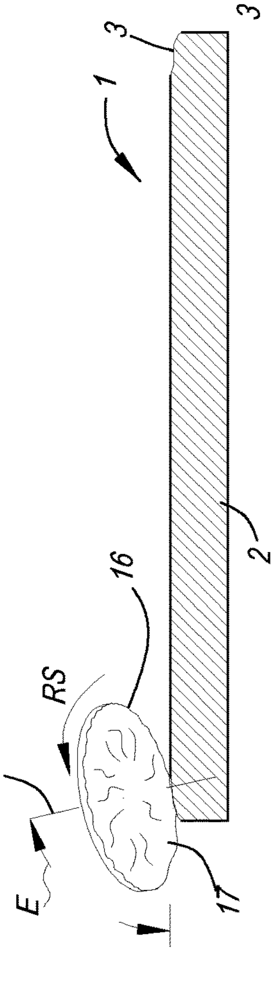
FIG. 6 is a cross section taken along the plane VI of FIG. 5.

FIG. 6 is a cross section taken along the plane VI of FIG. 5.

Figure 7:
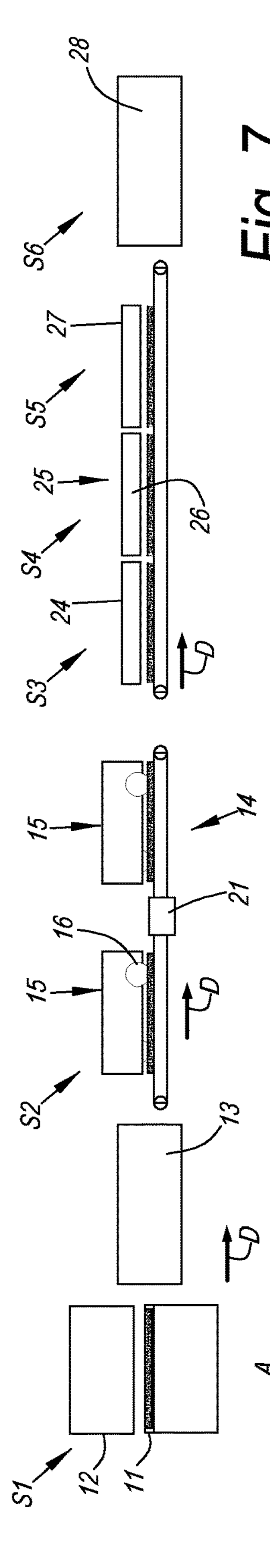
FIG. 7 shows some stages of the method according to the invention.

FIG. 7 shows some stages of the method according to the invention.

Figure 8:
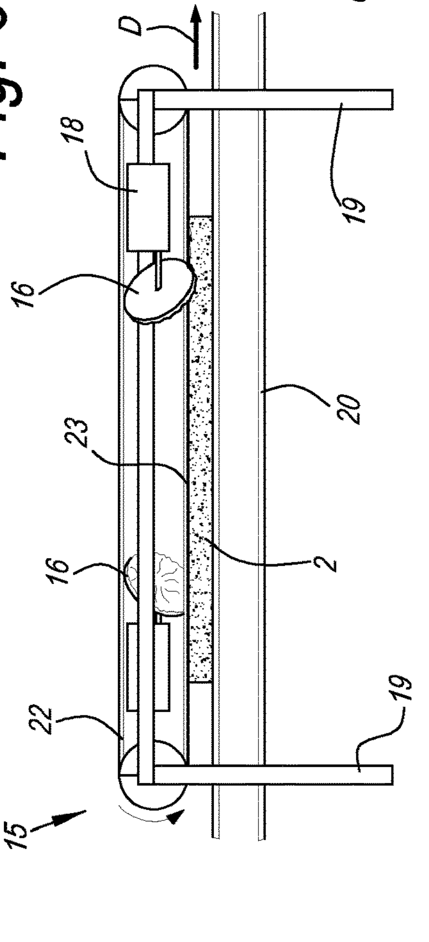
FIG. 8 is a schematic side view of a decorating apparatus according to the invention.

FIG. 8 is a schematic side view of a decorating apparatus according to the invention.

Figure 9:
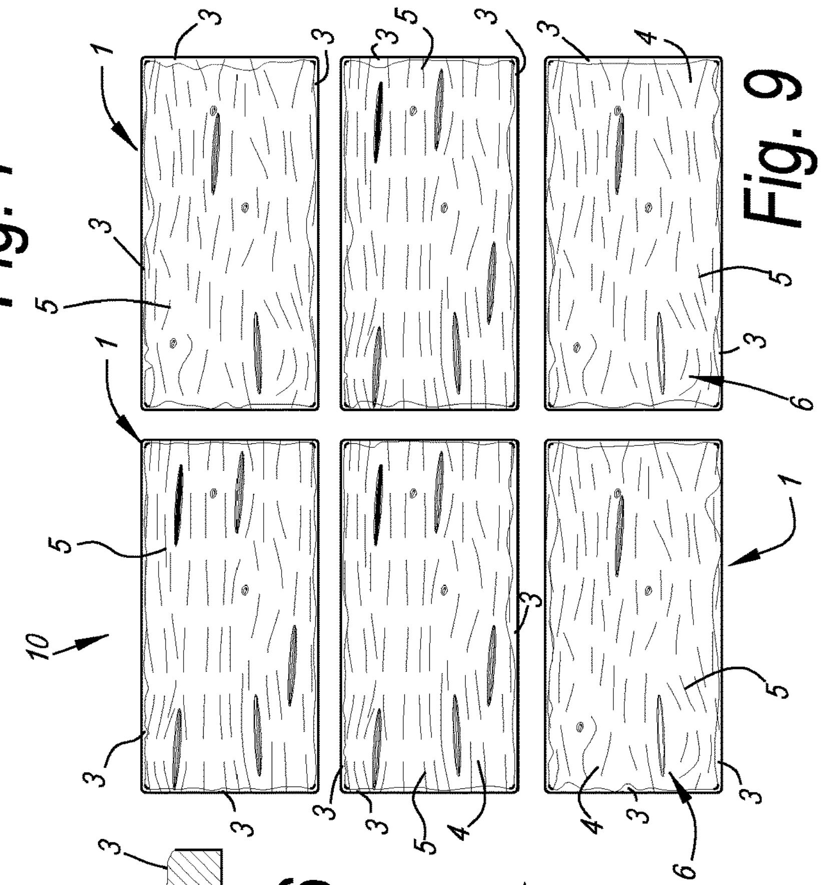
FIG. 9 is a top view of a set of covering elements according to the invention.

FIG. 9 is a top view of a set of covering elements according to the invention.

FIG. 1 shows a covering element 1, for floors or wall cladding for example, which comprises a backing 2. For example, the covering element is a ceramic tile or slab, that is to say one comprising a backing 2 of ceramic material, for example porcelain stoneware, single-fired ceramic material, white or red body ceramic material, majolica, terracotta, or other ceramic powders sintered at high temperatures, and is preferably of rectangular or square shape.

As shown in FIG. 1, the covering element 1 also comprises at least one distressed upper edge 3, or preferably a plurality of distressed upper edges 3; better still, all the upper edges 3 of the covering element 1 are distressed. The term "distressed" is taken to mean that the upper edge 3 has an artificially created shape and is such as to simulate the wear on the upper edge 3 due to time and use, such as chips, scratches, scrape marks and incisions. In other words, the surface of the upper edge 3 comprises a shape, for example a three-dimensional structure, formed by recesses and protrusions, having irregular characteristics, for example variations in depth, width and/or length, and arranged in a random and non-predetermined order. Thus the distressed upper edge 3 gives a general impression of distressing and wear of the covering element 1, thereby reducing the impression of its artificiality.

As shown in FIG. 1, all the upper edges 3 of the covering element 1 are distressed. Preferably, the upper edges 3 are distressed along their whole length. It is also emphasized that each distressed upper edge 3 has a different shape from the other distressed upper edges 3 of the same covering element 1.

FIG. 1 also shows that the covering element 1 has an upper face 4 bearing a pattern 5 having various colours, designs or graphics. In particular, the pattern 5 is formed on at least a central portion 6 of the upper face 4 of the covering element 1. Evidently, the expression "central portion" 6 is taken to mean substantially the whole upper face 4, with the exception of the distressed upper edge 3, so that the distressed upper edge 3 substantially forms a frame around the pattern 5. However, in the preferred embodiment shown in FIG. 1, the pattern 5 is formed on the whole of the upper face 4 of the covering element 1. In other words, the distressed upper edge 3 is provided with the pattern 5.

FIGS. 2, 3 and 4 show that the covering element 1 may comprise coating layers capable of at least partially coating the upper face 4 of the covering element 1.

In particular, the covering element 1 comprises a base coat 7, for example a glaze or an engobe, configured to cover the upper surface of the backing 2 at least partially, or preferably entirely. In particular, according to the preferred embodiment, the base coat 7 is configured to cover the distressed upper edge 3 at least partially, or preferably entirely. In this case, the shape of the distressed upper edge is apparent through the base coat 7.

The covering element 1 further comprises a protective coat 8, for example a transparent glaze or a grit, which covers the upper face 4 at least partially, or preferably entirely, and which can be placed on top of the pattern 5 so as to cover and protect it. According to the preferred embodiment, the protective coat 8 covers the distressed upper edge 3 at least partially, or preferably entirely, the shape of the distressed upper edge 3 being apparent through the protective coat 8. Advantageously, the protective coat 8 is transparent or translucent.

As shown in FIG. 4, the upper face 4 of the covering element 1 comprises a relief structure 9, for example comprising recesses and protrusions, preferably arranged in a predetermined order, but there is no reason why such recesses and protrusions should not be arranged in a random order. In particular, the relief structure 9 is arranged in the central portion 6 of the upper face 4. In particular, FIG. 4 shows an example of embodiment in which the relief structure 9 may comprise recesses and protrusions formed in the backing 2, which are apparent on the upper face 4 of the covering element 1 through the base coat 7 and the protective coat 8.

FIG. 9 shows a set 10 of covering elements 1, each having one or more of the characteristics described above, and in which the distressed upper edges 3 have a different shape in each covering element 1. In other words, all the distressed upper edges 3 of the set 10 are shaped differently from one another.

FIG. 9 shows an example of embodiment in which at least two covering elements 1 of the set 10 have substantially the same pattern 5. In particular, the pattern 5 is the same in the central portion 6 of the upper face 4 of said two covering elements 1. Additionally, according to this embodiment, at least two covering elements 1 of the set 10 have substantially the same relief structure 9. In particular, the relief structure 9 is the same in the central portion 6 of the upper face 4.

FIG. 7 shows schematically a preferred embodiment of a method for decorating and manufacturing the covering elements 1 described above.

The method shown in FIG. 7 comprises, in the first place, a step S1 of preparing the backing 2 of the covering element 1, for example a backing of ceramic material. According to this example, the preparation step S1 provides for the forming of the backing 1, by pressing for example. In practice, a body of wet ceramic raw materials is placed in a mould 11 of a press 12, and pressed to form the backing 2. During the pressing, the relief structure 9 may be formed on the upper surface of the backing 2, by means of a suitably shaped die, for example. Additionally, according to this example, the preparation step S1 comprises drying the newly formed backing 2 to remove the excess moisture from the body and give the backing sufficient mechanical strength for movement. The drying is preferably carried out in a dryer 13 at temperatures above 80° C., for example above 100° C.

After the preparation step S1, the backing is conveyed to a distressing station 14 to be subjected to a step of distressing S2, of the mechanical type for example, that is to say a step capable of causing the mechanical erosion or incision of the upper edge 3 of the backing 2. In the example illustrated in FIGS. 5, 6 and 7, the distressing station 14 comprises at least one distressing apparatus 15 having a shaped grinding wheel 16, that is to say one in which the active surface 17 of the grinding wheel 16 (in other words the active surface of the grinding wheel 16 adapted to come into contact with the upper edge 3 to be distressed) is not flat, but has protuberances and/or pits. The grinding wheel 16 is driven in rotation about its own axis A by a drive device 18, for example an electric motor. The grinding wheel 16 and the drive device 18 are supported by a frame 19 of the distressing apparatus 15. Additionally, according to the preferred embodiment, the grinding wheel 16 rotates about its own axis A at a variable rotation speed RS, for example with irregular and non-predetermined variations. For example, the grinding wheel 16 may rotate about its own axis A at a rotation speed RS of between 15 Hz and 70 Hz, or preferably between 20 Hz and 60 Hz.

As indicated in FIG. 5, the axis A of the grinding wheel is incident on the upper edge 3 to be distressed, that is to say on an imaginary straight line parallel to said upper edge 3, so that an angle of incidence IA of between 90° and 180°, for example between 120° and 180°, is formed between them. Additionally, as shown in FIG. 6, the axis A of the grinding wheel 16 is incident on the plane in which the backing 2 lies, on a horizontal plane for example, so that a working angle EA of between 0° and 90°, for example between 45° and 90°, is formed between said axis A and the plane in which the backing 2 lies.

Additionally, as shown by FIGS. 5, 6 and 7, during the distressing step S2 the backing 2 is moved along a direction of advance D, preferably parallel to the upper edge 3 to be distressed. In practice, the distressing station 14 comprises a conveyor 20, preferably of the band or belt type, and the grinding wheel 16 is positioned at the side of said conveyor 20. Preferably, the distressing apparatus comprises a plurality of grinding wheels 16, for example a pair of grinding wheels 16 positioned on opposite sides of the conveyor 20 to act on opposite parallel upper edges 3 of the backing 2. The frame 19 of the distressing apparatus 15 may be connected, by fixing for example, to the conveyor 20, which then acts as a supporting device for the backing 2 during the distressing. In the preferred example of embodiment shown in FIG. 7, the distressing station 14 comprises two distressing apparatuses 15, each having two grinding wheels 16 positioned on opposite sides of the conveyor 20 to act on opposite parallel upper edges 3 of the backing 2, and comprises a swivel device 21 positioned between the apparatuses 15 and capable of modifying the position of the backing 2 relative to the direction of advance D, or of modifying the direction of advance D. Thus the second apparatus 15 is enabled to distress the upper edges 3 of the backing 2 that have not been distressed by the first apparatus 15, in order to distress all the upper edges 3 of the backing. For example, the swivel device 21 may be a device that rotates the backing 2 through 90° relative to an axis orthogonal to the plane in which the backing 2 lies, for example a vertical axis, or may be a device that modifies the direction of advance D by 90°.

The apparatus 15 also comprises retaining elements 22, configured to keep the covering element 1, that is to say the backing 2 of the covering element 1, in a substantially fixed position relative to the conveyor 20. In practice, the retaining elements 22 are configured to limit, or preferably prevent, movements of the covering element 1 relative to the conveyor 20 in the plane parallel to the direction of advance D, and to limit, or preferably prevent, movements of the covering element 1 in a direction orthogonal to the plane in which the element lies, that is to say in a substantially vertical direction. According to the preferred embodiment shown in FIG. 8, the retaining elements 22 comprise a horizontal border 23 capable of pressing on the upper surface of the backing 2. In greater detail, in the preferred embodiment, the horizontal border 23 comprises a band or belts driven around rollers or pulleys, so that the portion of the horizontal border 23, which presses on the upper surface of the backing 2, moves along the direction of advance D, for example at the same speed of advance as the covering element 1.

After the distressing S2, the backing 2 undergoes a step of applying a base coat S3 on the upper surface of the backing 2. For example, the backing 2 is conveyed to a coating station, for example a glazing station 24, where the coating layer is applied, preferably in the wet state, by spraying or in a film for example, to provide uniform coverage of the upper surface of the backing 2, including the distressed edges 3.

Following the application of the base coat S3, the decoration S4 of the upper face 4 of the covering element 1 is carried out. In practice, the backing 2 is conveyed to a decoration station 25 having a digital inkjet printer 26 or other decoration devices. Inkjet printing, and contactless printing methods in general, are preferred because they enable the pattern 5 to be applied on the distressed edges 3 of the covering element 1.

After the distressing S4, the backing 2 undergoes a step of applying a protective coat S5 on the upper surface of the backing. For example, the backing 2 is conveyed to a covering station 27 having a grit application device, a spray gun or other device capable of applying the protective coat 8.

The decorated and coated backing 2 is then subjected to a step S6 of high-temperature firing, in a roller kiln 28 for example, in which the sintering of the backing 2 and the fixing of the pattern 5 and the coating layers 7, 8 to the backing take place. For example, the firing S6 is carried out at a temperature T of more than 900° C., or preferably more than 1000° C., for example about 1200° C.

The present invention is not limited in any way to the embodiments described above, but said covering elements and systems may be produced according to different variants without thereby departing from the scope of the present invention.

What is claimed is:

1. A method for decorating covering elements for floors and/or walls, comprising the steps of:

providing a backing of green ceramic material for the covering element;

distressing all upper edges of the green ceramic material backing;

applying at least one coating layer on an upper surface of the green ceramic material backing after the distressing step, the at least one coating layer comprising a glaze; and firing the covering element comprising the green ceramic material backing and the at least one coating layer in the same step after the distressing step, wherein the distressing step is performed by a shaped grinding wheel that rotates about its own axis at a variable rotation speed such that each distressed upper edge has a different shape from other distressed upper edges, wherein the green ceramic material backing is conveyed along an advance direction by a conveyor, wherein during the distressing step, the green ceramic material backing is retained by retaining elements in a substantially fixed position relative to the conveyor, the retaining elements comprising a horizontal border that presses on a central portion of the upper surface of the green ceramic material backing, wherein the horizontal border comprises a band or belt driven along the advance direction, and wherein a width of the horizontal border is less than a width of the green ceramic material backing.

2. The method according to claim 1, wherein the at least one coating layer is applied on all of the distressed upper edges.

3. The method according to claim 1 further comprising a step of applying a pattern on an upper surface of the green ceramic material backing after the distressing step.

4. The method according to claim 3, wherein the step of applying the pattern includes the application of the pattern on all of the distressed upper edges.

5. The method according to claim 1, wherein the at least one coating layer comprises a glaze.

6. The method according to claim 1, wherein the shaped grinding wheel is not flat.

7. The method according to claim 6, wherein the shaped grinding wheel has protuberances and/or pits.

8. The method according to claim 1, wherein the variable rotation speed is between 15 Hz and 70 Hz.

9. The method according to claim 8, wherein the variable rotation speed is between 20 Hz and 60 Hz.

10. The method according to claim 1, wherein the step of providing the green ceramic material backing comprises compacting powders of ceramic raw materials by discontinuous pressing to form a compacted green ceramic material backing, and drying the compacted green ceramic material backing.

11. The method according to claim 10, wherein the distressing step is performed after the drying step.

12. The method according to claim 10, wherein during the compacting step, a relief is formed on a central portion of the upper surface of the green ceramic material backing.

* * * * *